(12) United States Patent
Gilley, Jr. et al.

(10) Patent No.: US 9,096,379 B2
(45) Date of Patent: Aug. 4, 2015

(54) ROLLER-NOISE REDUCTION IN CONVEYOR BELTS

(75) Inventors: Henry H. Gilley, Jr., Slidell, LA (US);
David C. Weiser, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/127,436

(22) PCT Filed: Jun. 21, 2012

(86) PCT No.: PCT/US2012/043439
§ 371 (c)(1),
(2), (4) Date: Dec. 18, 2013

(87) PCT Pub. No.: WO2013/003173
PCT Pub. Date: Jan. 3, 2013

(65) Prior Publication Data
US 2014/0183009 A1    Jul. 3, 2014

Related U.S. Application Data

(60) Provisional application No. 61/502,681, filed on Jun. 29, 2011.

(51) Int. Cl.
*B65G 15/30* (2006.01)
*B65G 15/32* (2006.01)
*B65G 17/24* (2006.01)
*B65G 17/40* (2006.01)

(52) U.S. Cl.
CPC ............... *B65G 15/32* (2013.01); *B65G 17/24* (2013.01); *B65G 17/40* (2013.01); *B65G 2207/30* (2013.01); *B65G 2207/32* (2013.01)

(58) Field of Classification Search
USPC .......................................... 198/779
See application file for complete search history.

(56) References Cited

U.S. PATENT DOCUMENTS

| | | | |
|---|---|---|---|
| 2,253,141 A | 8/1941 | Schofield | |
| 3,147,844 A * | 9/1964 | Mountz | 198/458 |
| 3,677,382 A | 7/1972 | Coppel | |
| 4,523,674 A * | 6/1985 | Haugen et al. | 198/843 |
| 6,209,714 B1 | 4/2001 | Lapeyre et al. | |
| 7,204,359 B2 * | 4/2007 | Kanaris | 193/37 |
| 2006/0185966 A1 | 8/2006 | Eberle | |
| 2007/0256908 A1 | 11/2007 | Yazaki et al. | |
| 2008/0271978 A1 | 11/2008 | Weiser | |
| 2012/0298485 A1 | 11/2012 | Miller et al. | |

* cited by examiner

*Primary Examiner* — William R Harp
(74) *Attorney, Agent, or Firm* — James T. Cronvich

(57) ABSTRACT

Low-noise rollers in modular plastic conveyor belts. Energy-absorbing elements formed on belt rollers or in roller support structure is used to absorb the energy of impacts between rollers and the support structure. The energy-absorbing elements include resilient roller sections sandwiched between rigid sections, spring-like bent tabs on the end faces of rollers, hinged bumpers or flexible fingers between the end faces of the rollers and the roller support structure, and flexible structure protruding from the module into circumferential grooves in the outer cylindrical surface or circular grooves formed in the end faces of the rollers.

26 Claims, 4 Drawing Sheets

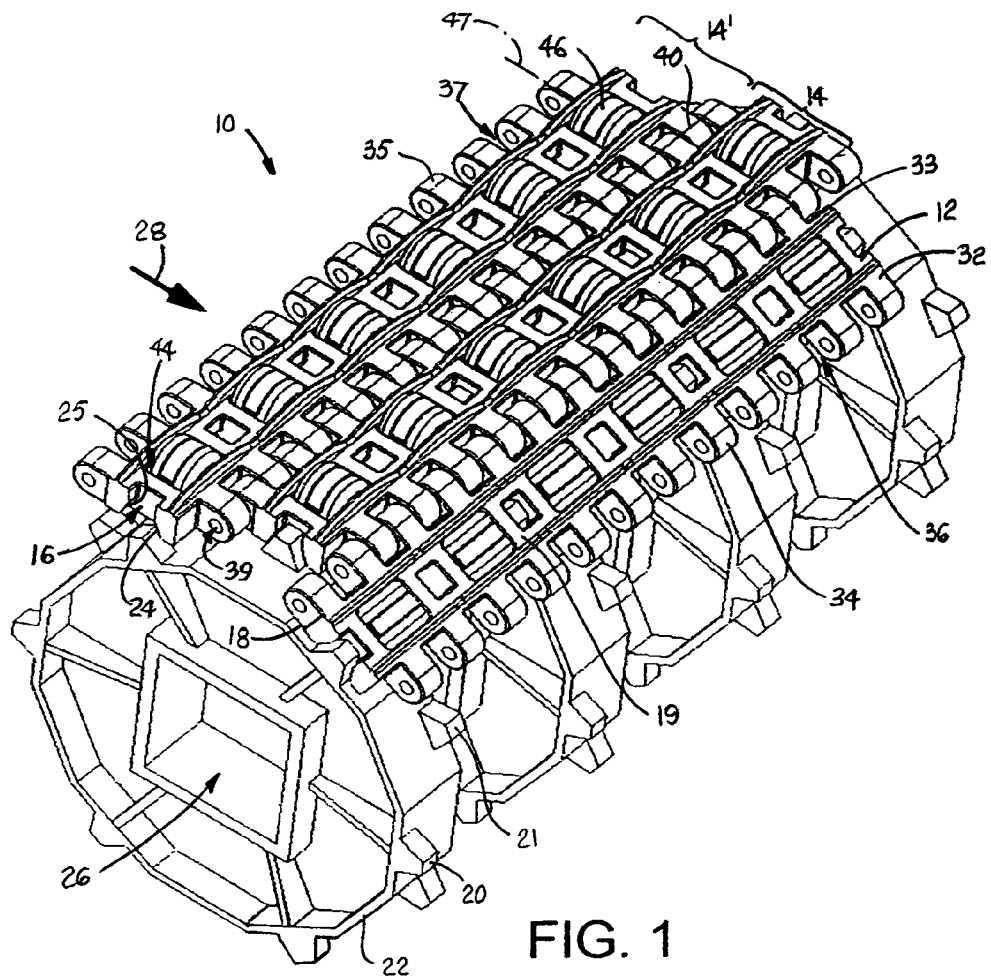
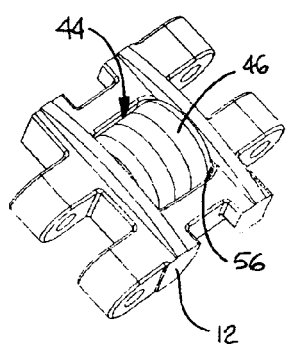
FIG. 2
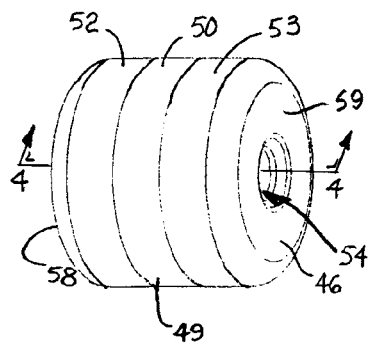
FIG. 3
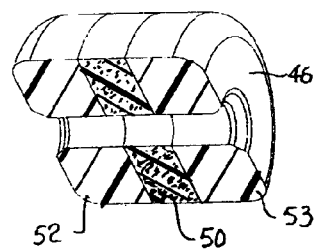
FIG. 4

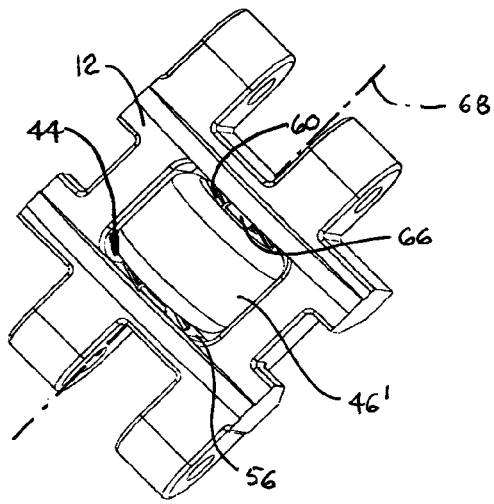
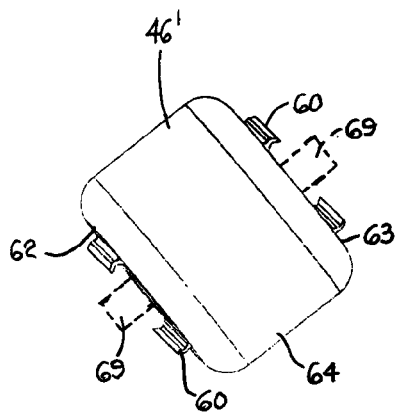
FIG. 5
FIG. 6
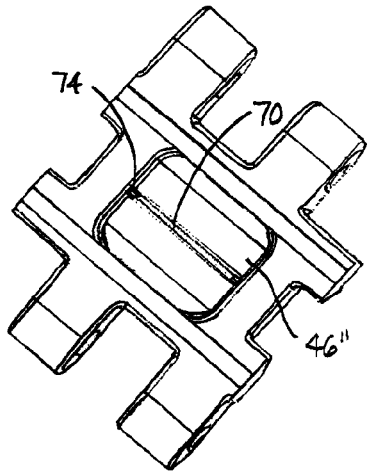
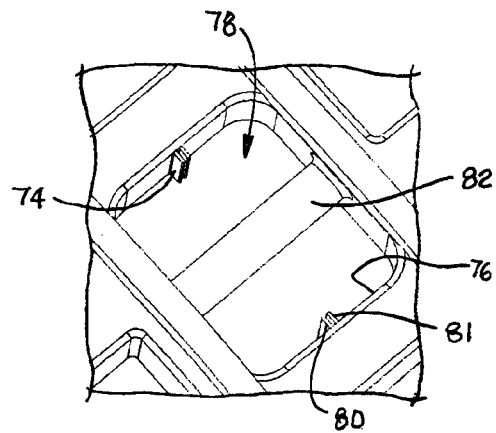
FIG. 7
FIG. 8
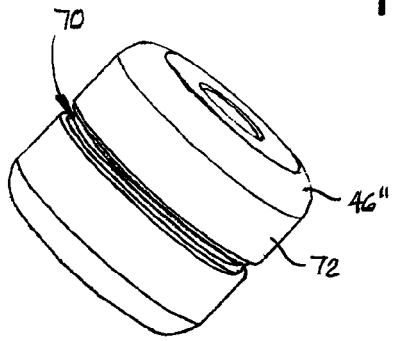
FIG. 9

US 9,096,379 B2

ROLLER-NOISE REDUCTION IN CONVEYOR BELTS

BACKGROUND

The invention relates generally to power-driven conveyors and more particularly to conveyor belts with rollers.

Conveyor belts, especially modular plastic conveyor belts, having article-supporting or friction-reducing rollers are used in many conveying applications. The rollers are mounted on axles whose ends are supported in end supports upstanding from an outer belt surface or in the walls of cavities in the body of the belt. The spacing of the end supports or the diameter of the cavities is sufficiently greater than the axial length of the roller to prevent the roller from binding. As the conveyor belt is operated, axial movement of the rollers causes the rollers to bang into the end supports or the cavity walls. In belts with many rollers, the noise of the rollers hitting the hard plastic of the modular conveyor belt can be loud. In transverse roller-top belts, the rollers are aligned across the width of the belt in rows with the axles parallel to the direction of belt travel. All the rollers in a row tend to hit their forward support at the same time at the start of their engagement with the sprockets at the end of the carryway. The regular, loud clicking sound of the rollers as each row rounds the sprockets can be loud enough to reach or exceed OSHA limits for noise (80 dB). And radial motion of the rollers along the carryway can produce a rattling sound.

Thus, there is a need to reduce the noise of rollers in conveyor belts.

SUMMARY

This need is addressed by a conveyor belt embodying features of the invention. The conveyor belt comprises rollers that have two opposite ends joined by an outer cylindrical surface. The rollers are rotatable about and translatable along axes of rotation. Support structure supports the rollers at the two opposite ends. An energy-absorbing element positioned on each of the rollers or the support structure absorbs the energy of impacts between the rollers and the support structure as the conveyor belt moves.

In another aspect, a conveyor belt module usable with other such modules to construct a conveyor belt comprises a module body having a cavity bounded by side walls. A roller has an axle whose opposite ends are supported by opposite side walls of the cavity. An energy-absorbing element disposed on the rollers or the support structure absorbs the energy of roller impacts between the roller and the side walls as the roller translates axially in the cavity.

In another aspect, a conveyor-belt roller comprises a roller body that has an endless outer cylindrical surface and a pair of opposite end faces joined by the outer cylindrical surface. An axis of rotation extends through the opposite end faces of the roller body. An energy-absorbing element in the roller body reduces the noise of the roller body moving on its axis of rotation.

BRIEF DESCRIPTION OF THE DRAWINGS

These aspects, features, and advantages of the invention are described in more detail in the following description, appended claims, and accompanying drawings, in which:

FIG. 1 is an isometric view of a portion of a modular plastic roller-top conveyor belt embodying features of the invention;

FIG. 2 is an isometric view of a portion of a conveyor belt module usable in a roller-top conveyor belt as in FIG. 1;

FIG. 3 is an oblique view of a roller in the belt module of FIG. 2;

FIG. 4 is a cross section of the roller of FIG. 3;

FIG. 5 is an axonometric view of a portion of a conveyor belt module as in FIG. 2 with another version of roller;

FIG. 6 is an isometric view of the roller of FIG. 5;

FIG. 7 is an axonometric view of a portion of another conveyor belt module usable in a conveyor belt as in FIG. 1;

FIG. 8 is an enlarged isometric view of the roller cavity of the conveyor belt module of FIG. 7 with the roller omitted;

FIG. 9 is an enlarged isometric view of the roller in the belt module of FIG. 7;

DETAILED DESCRIPTION

Figure 10:
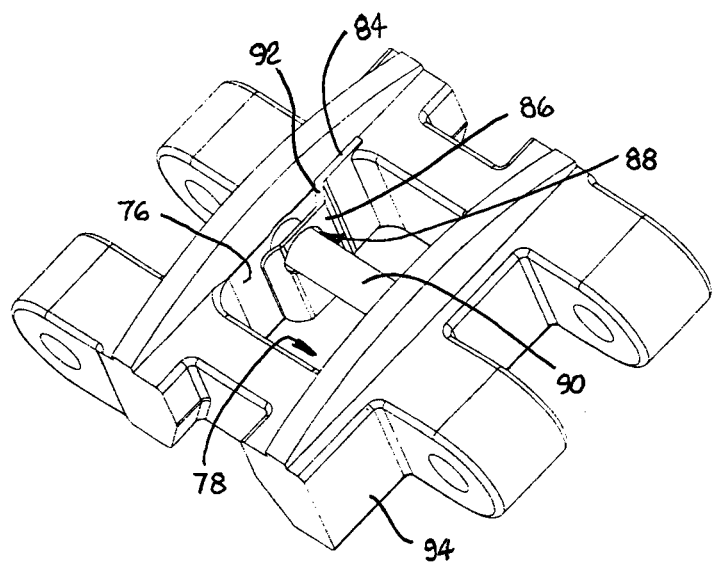
FIG. 10 is an isometric view of a portion of a conveyor belt module for use in a conveyor belt as in FIG. 1 with the roller removed to show a flexible energy-absorbing element unitarily molded with the module body.

A portion of a conveyor belt embodying features of the invention is shown in FIG. 1. The portion of the modular conveyor belt 10 shown is an interior portion. Three conveyor belt modules 12 are connected together in three belt rows 14. The modules are shown offset laterally from row to row in a bricklay pattern. Although only one module 12 is shown in each row 14, other similar modules are connected side by side in each row to form an endless conveyor belt. Drive pockets 16 opening onto bottom sides 18 of the modules admit teeth 20, 21 of drive or idle sprockets 22. The teeth 20, 21 of drive sprockets drive against leading drive surfaces 24 bounding the pockets. The teeth 20, 21 of idle sprockets are driven by trailing drive surfaces 25 bounding the pockets opposite the leading drive surfaces. The teeth are arranged in two groups around the periphery of each of the sprockets. Each group is laterally offset from the other across the width of the sprocket. The teeth 20 in a first group are staggered circumferentially from the teeth 21 in a second group, with the teeth in each group spaced at twice the pitch of the conveyor belt. In this way, the teeth are positioned to engage the drive pockets 16, which are laterally offset from row to row. The teeth 20 in the first group engage all the even rows, and the teeth 21 in the second group engage all the odd rows. The endless belt is trained around idle and drive sprocket sets, which are mounted on shafts (not shown) received in bores 26 of the sprockets. The shaft of the drive sprockets is rotated by a motor and gear box (not shown) to drive the belt in a direction of travel 28.

Each module 12 has hinge elements of a first set 34 spaced apart laterally along a first end 32 and hinge elements of a second set 35 spaced apart laterally along a second end 33. First and second gaps 36, 37 between the hinge elements of the first and second sets 34, 35 are sized to allow the first set of hinge elements of one row to interleave with the second set of hinge elements of an adjacent row. Hinge pins through aligned openings 39 in the interleaved hinge elements connect adjacent rows together at hinge joints 40 in the endless belt 10.

Each belt module 12 has one or more cavities 44 that open onto the top side 19 of the module. In the version shown, the cavities also open onto the bottom side 18 and are alternately positioned across the width of the module with the drive pockets 16, which are shown also opening onto the top side 19. A belt roller 46 is mounted in each cavity for rotation on an axis 47 parallel to the direction of travel 28 in a transverse-roller configuration, in which the rollers rotate transverse (perpendicular) to the direction of travel of the belt. (This is opposed to an in-line configuration, in which the rollers rotate on axes perpendicular to the direction of belt travel 28.) The rollers 46 on one row 14 are shown offset in the width direction from those in an adjacent row 14' for more even article support. The lateral offset from row to row means that the drive pockets 16 are also laterally offset from row to row. The laterally offset and circumferentially staggered groups of teeth 20, 21 on the sprockets accommodate the offset roller arrangement. Salient portions of the rollers 46 extend above the top side 19 of the belt into a supporting position for conveyed articles.

As a belt row 14 starts to articulate about the sprockets 22, all the transverse rollers 46 in the row tend to slide axially downward in their cavities 44. The roller 46, shown enlarged in FIGS. 2-4, comprises a roller body 49 having an energy-absorbing element in the form of a flexible or resilient inner section 50 sandwiched between two rigid sections 52, 53. When the roller slides along the axle received in its bore 54, some of the energy of the roller's impact with a side wall 56 of the cavity is absorbed by the compression of its resilient inner section 50 and the noise reduced. The rigid outer sections 52, 53 are made of a rigid thermoplastic material that has a low coefficient of friction. In this way, friction between the roller and its axle and between end faces 58, 59 of the roller and side walls 56 of the cavity 44 is reduced. Examples of low-friction thermoplastic materials include acetal, polypropylene, and nylon. The resilient inner section 50 is made from rubber or an elastomeric thermoplastic that helps absorb noise that could be generated by the rotation of a roller or by the impact of a transverse roller against a cavity wall.

Another version of a noise-reducing roller is shown in FIGS. 5 and 6. In this example, the roller 46' has an energy-absorbing element in the form of flexible members 60 that protrude outward from end faces 62, 63 of the roller body 64. The flexible members shown are bent tabs that compress like a lossy spring upon impact with the side wall 56 bounding the roller cavity 44 when the roller 46' slides along its axle 66. Thus, the flexible tabs absorb the energy of the impact and reduce the noise. In this example, energy-absorbing elements comprise four bent tabs 60, two on each end face 62, 63 on opposite sides of the axle 66, which defines the roller's axis of rotation 68. If the tabs extend outward far enough so that they contact the walls slightly even when the roller is centered, they can provide some minimal resistance to radial motion of the roller and, in that way, reduce roller rattling. Instead of having a bore that receives an axle, this roller and the other roller versions could have an integral axle or axle stub 69 affixed to the roller body 64 and extending outward of the end faces 62, 63. The integral axles 69 are received in the cavity walls with freedom to rotate with the roller body in the cavity.

Yet another version of a low-noise belt roller is shown in FIGS. 7-9. In this version, the roller 46" has an endless circumferential groove 70 formed in its outer cylindrical surface 72. An energy-absorbing element in the form of flexible members 74 protrudes outward from a side wall 76 of the cavity 78. The flexible members ride in the roller's groove 70 and complete the noise-reduction structure of this roller system. In this example, each of the flexible members comprises a pair of thin side-by-side ridges 80, 81. The ridges are thin enough that they can flex to provide shock absorption to axial movement of the rollers. As shown in FIG. 8, the flexible members 74 protrude from the cavity's side walls on opposite sides of the roller axle 82. The side walls serve as roller support structure in the module by supporting the opposite ends of the axle 82.

Another version of energy-absorbing element is shown in FIG. 10. The energy-absorbing element 84 includes a bumper plate 86 with a hole 88 that accommodates a roller axle 90. The bumper plate 86 is joined to the side wall 76 of the cavity 78 by a living hinge 92, which gives the energy-absorbing element the flexibility required to absorb shocks from axial impacts caused by a roller translating along the axle 90 and colliding with the bumper. The energy-absorbing element is unitarily molded with the module body 94. The plate is thin enough that its connection with the axle required for easy molding can be broken under slight pressure. If the bumper plate extends outward far enough so that it contacts the roller slightly at all times, it can provide some resistance to radial motion of the roller and reduce roller rattling.

Figure 11:
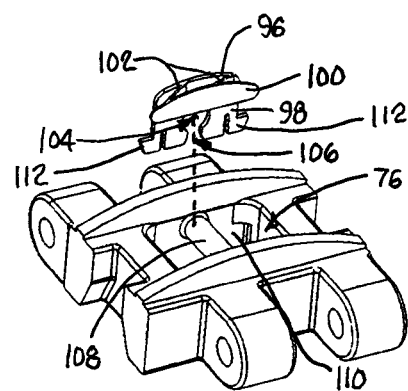
FIG. 11 is an exploded view of a portion of a conveyor belt module for use in a conveyor belt as in FIG. 1 with the roller removed to show a detachable energy-absorbing element.

Yet another energy-absorbing element is shown in FIG. 11. The element 96 includes a base 98 and a bumper 100 joined by a pair of oblique legs 102. The legs form living hinges between the base and the bumper that gives the energy-absorbing element 96 its flexibility. The base 98 also includes a hole 104 with an open neck 106 that allows the base 98 to be snapped in place over the axle 108 in the cavity 76. The base is backed by the side wall 110 at the end of the axle 108. Other retention structure, in the form of tabs 112 at the bottom of the base mating with tab-receiving structure in the cavity, also helps retain the base in place in the cavity. If the bumper extends outward far enough so that it contacts the roller slightly at all times, it can provide resist radial motion of the roller and reduce roller rattling.

Figure 12:
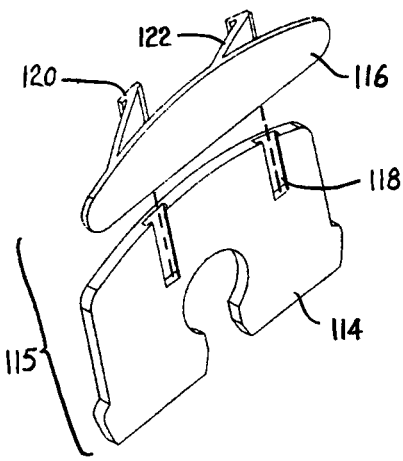
FIG. 12 is an exploded view of an energy-absorbing element as in FIG. 11 with a separable base and hinged bumper.

FIG. 12 shows a separable version 115 of an energy-absorbing element as in FIG. 11. In this version, a base 114 is formed separately from a bumper plate 116. Undercut slots 118 in the top of the base receive bars 120 at the distal ends of legs 122 extending obliquely from the back of the bumper plate 116. The bars are removably retained in the slots. The separable energy-absorbing assembly 115 is removably inserted in the cavity like the energy-absorbing element 96 of FIG. 11.

Figure 13:
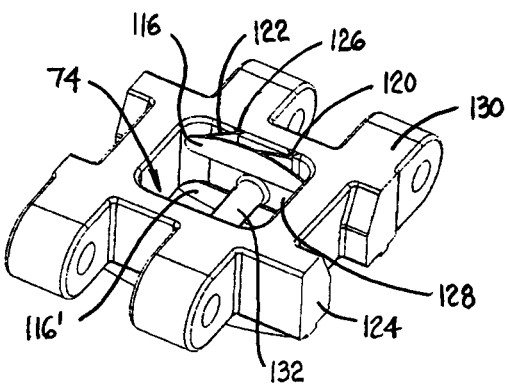
FIG. 13 is a bottom isometric view of a portion of a conveyor belt module for use in a conveyor belt as in FIG. 1 with the roller removed to show a detachable energy-absorbing bumper.

In the belt module body 124 of FIG. 13, slots 126 are formed in side walls 128 bounding a roller cavity 76. The slots open onto the bottom side 130 of the module body 124. The bumper plate 116 of FIG. 12 can be inserted in the cavity 76 with the slots 126 receiving the bars 120 at the distal ends of the legs 122. A second bumper plate 116' can be similarly installed in the cavity from the top or the other side of the roller axle 132. The bars can be permanently retained by adhesives, plastic welding, or other conventional bonding methods.

Figure 14:
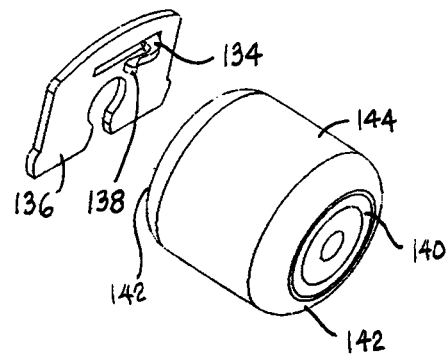
FIG. 14 is an exploded view of another version of a roller and energy-absorbing element usable in a conveyor belt as in FIG. 1.

Another snap-in energy absorbing element is shown in FIG. 14. In this version, a flexible finger 134 extends outward of a snap-in base 136 to a finger tip 138. The finger tip is received in a circular groove 140 formed in the end face 142 of a cylindrical roller 144. The finger is naturally biased toward the roller and absorbs axially impacts from the roller. The finger tip is positioned to ride in the groove and resist back-and-forth radial motion of the roller that could cause a rattling sound. Like the bent tabs of FIGS. 5 and 6, the bumper plate of FIGS. 10-13 and the flexible finger of FIG. 14 can be positioned at one or both ends of the roller.

The resilient inner section 50 of the roller 46 of FIG. 3, the bent tab 60 of the roller of FIG. 6, the hinged bumpers, the flexible fingers, and the combination of the thin ridges 80, 81 and the roller grooves 70 in the belt module of FIG. 7 are examples of noise-reduction structure that absorbs the energy of roller impacts to reduce noise between a roller and roller support structure in the belt module as the conveyor belt moves.

Although the invention has been described in detail with respect to a few versions, other versions are possible. For example, the energy-absorbing elements could also work with in-line rollers, i.e., rollers whose axes of rotation are perpendicular to the direction of travel 28. As another example, the rollers could be supported atop the belt modules between end support structure upstanding from the outer module surface, rather than embedded in cavities. So, as these few examples suggest, the scope of the claims is not meant to be limited to the details of the versions described in detail.

What is claimed is:

1. A conveyor belt comprising:
   a plurality of rollers each having two opposite ends joined by an article-supporting outer surface;
   a plurality of axles rotatably supporting the rollers and defining axes of rotation about which the rollers are rotatable and along which the rollers are translatable, wherein the axles have two opposite ends;
   support structure for supporting the two opposite ends of the axles;
   an energy-absorbing element positioned on at least one of the support structure and the roller to absorb the energy of impacts between the rollers and the support structure as the conveyor belt moves.

2. A conveyor belt as in claim 1 wherein the energy-absorbing element comprises a resilient section of each of the rollers sandwiched between rigid sections of each of the rollers.

3. A conveyor belt as in claim 1 wherein the energy-absorbing element comprises a bendable tab that protrudes outward from the rollers and that compresses upon contact with the support structure.

4. A conveyor belt as in claim 1 wherein the energy-absorbing element comprises flexible members protruding outward from the support structure that compress upon contact with the rollers.

5. A conveyor belt as in claim 4 wherein the rollers have circumferential grooves in their outer surfaces and the flexible members protrude from the support structure into the grooves.

6. A conveyor belt as in claim 4 wherein the rollers have circular grooves in their ends and the flexible members protrude from the support structure into the grooves.

7. A conveyor belt as in claim 4 wherein the flexible members are positioned to contact the rollers and resist radial motion of the rollers.

8. A conveyor belt as in claim 1 wherein the axes of rotation are parallel to a direction of travel of the conveyor belt.

9. A conveyor belt as in claim 1 wherein the energy-absorbing element comprises a hinged bumper disposed between the support structure and each roller.

10. A conveyor belt as in claim 1 wherein the energy-absorbing element includes retention structure that removably retains the energy-absorbing element in place.

11. A conveyor belt module usable with other such modules to construct a conveyor belt, comprising:
   a module body having a cavity bounded by side walls;
   a roller disposed in the cavity and having an article-supporting outer surface;
   an axle rotatably supporting the roller, the axle having opposite ends supported by opposite side walls of the cavity;
   an energy-absorbing element disposed on the roller or the side walls to absorb the energy of impacts between the roller and the opposite side walls as the roller translates axially in the cavity.

12. A conveyor belt module as in claim 11 wherein the energy-absorbing element comprises a flexible section of the roller sandwiched between rigid sections of the roller.

13. A conveyor belt module as in claim 11 wherein the energy-absorbing element comprises a flexible member protruding outward from one of the roller and the side walls that compresses upon contact with the other of the roller and the side walls.

14. A conveyor belt module as in claim 11 wherein the roller has an outer cylindrical surface with a circumferential groove and the energy-absorbing element includes a flexible member that protrudes from one of the side walls into the groove.

15. A conveyor belt module as in claim 11 wherein the roller has a circular groove in at least one of its ends and the energy-absorbing element includes a flexible member that protrudes from one of the side walls into the groove.

16. A conveyor belt module as in claim 11 wherein the energy-absorbing element includes a flexible member is positioned to contact the roller and resist radial motion of the roller.

17. A conveyor belt module as in claim 11 wherein the energy-absorbing element comprises a hinged bumper disposed between the side walls and the roller.

18. A conveyor belt module as in claim 17 wherein the energy-absorbing element further comprises a base removably attachable in the cavity and wherein the hinged bumper has a pair of hinged legs whose distal ends are received in the base.

19. A conveyor belt as in claim 11 wherein the energy-absorbing element includes retention structure that removably retains the energy-absorbing element in the cavity.

20. A conveyor-belt roller comprising:
   a roller body having an endless article-supporting outer surface, a pair of opposite end faces joined by the outer surface, an axis of rotation extending through the opposite end faces, a rigid section, and a flexible section axially adjacent to the rigid section;
   wherein the rigid section and the flexible section each form a portion of the endless article-supporting outer surface; and
   wherein the flexible section is an energy-absorbing element that reduces the noise of the roller body moving on the axis of rotation.

21. A conveyor-belt roller as in claim 20 comprising at least two rigid sections and wherein the flexible section of the roller body is sandwiched between two of the rigid sections.

22. A conveyor-belt roller as in claim 21 wherein the flexible section is made of a flexible plastic material selected from the group consisting of: urethane, rubber, and thermoplastic elastomer.

23. A conveyor-belt roller as in claim 21 wherein the rigid sections are made of a rigid plastic material selected from the group consisting of: acetal, polypropylene, and nylon.

24. A conveyor-belt roller comprising:
a roller body having an endless outer surface, a pair of opposite end faces joined by the outer surface, and an axis of rotation extending through the opposite end faces;
an energy-absorbing element in the roller body to reduce the noise of the roller body moving on the axis of rotation;
wherein the energy-absorbing element comprises a flexible member protruding outward from one of the end faces of the roller body.

25. A conveyor-belt roller as in claim 24 wherein the flexible member comprises a bent tab that absorbs energy when compressed.

26. A conveyor belt-roller as in claim 24 comprising a plurality of flexible members positioned on opposite sides of the axis of rotation on the end faces.

\* \* \* \* \*